United States Patent [19]

Hoven

[11] 4,196,311
[45] Apr. 1, 1980

[54] BINARY-CODED MESSAGE COMMUNICATION

[75] Inventor: El Don L. Hoven, Newberg, Oreg.

[73] Assignee: Ford Industries, Inc., Portland, Oreg.

[21] Appl. No.: 913,285

[22] Filed: Jun. 7, 1978

[51] Int. Cl.² ............... H04L 7/00; H04M 11/00
[52] U.S. Cl. ................. 370/48; 179/2 A; 179/6 E
[58] Field of Search ............ 179/1 C, 2 C, 2 A, 6 E, 179/2 DP; 325/55, 64; 340/147 F, 147 SY, 349, 354, 356; 343/225; 178/53.1 R

[56] References Cited

U.S. PATENT DOCUMENTS

| 3,510,777 | 5/1970 | Gordon | 340/356 |
| 3,842,208 | 10/1974 | Paraskevakos | 179/2 A |
| 3,927,263 | 12/1975 | Fretwell | 179/2 DP |

FOREIGN PATENT DOCUMENTS 1177931  1/1970  United Kingdom ............ 179/6 E

*Primary Examiner*—Bernard Konick
*Assistant Examiner*—Joseph A. Popek
*Attorney, Agent, or Firm*—Kolisch, Hartwell, Dickinson & Stuart

[57] ABSTRACT

Binary-coded message communication for accessing, over a telephone line, a unit such as a telephone-answering device. Communication takes place through the use of time-space-assigned bursts of two different audio frequencies. One frequency is used in a single burst to define the beginning of a message, and the other frequency is used in one or more bursts to define a selected binary-code—the code being determined in accordance with the time-locations of such burst(s).

2 Claims, 4 Drawing Figures

BINARY-CODED MESSAGE COMMUNICATION

BACKGROUND AND SUMMARY OF THE INVENTION

This invention pertains to binary-coded message communication, and more particularly to such communication which is useful, as an example, for accessing, over a telephone line, a unit such as a telephone-answering device.

Telephone-answering devices have, in recent years, come into wide-spread use. As is well known, the typical answering device responds to an incoming telephone call by playing out a prerecorded message, followed by an invitation to the caller to record a message of his own. A number of prior art telephone-answering devices permit the owner to phone in from a remote telephone for the purpose of gaining access to the messages which have accumulated.

The present invention proposes a unique accessing system which is at once, simple, reliable, versatile, and extremely secure. "Security" is here used in the sense to mean that the invention proposes the use of a coding system whereby the likelihood of an unauthorized person gaining access to another's messages is extremely small.

An important object of the invention, therefore, is to provide a method and apparatus for binary-coded message communication which offers all of the features just mentioned.

According to a preferred embodiment of the system, the same includes a marker-signal generator for producing recurrent time-spaced marker signals each in the form of a burst of one selected audio-frequency. Working in conjunction with the marker-signal generator is digital decimal counter circuitry, which functions to define not only successive time slots for marker signals, but additional time slots between marker signals wherein code signals may be placed. Cooperating with these two components is a code-signal generator which functions to place in such additional time slots one or more bursts of another selected audio frequency, whose time-placement in these slots can be read and interpreted according to a binary code.

A decoder is provided which is readily attachable to, and incorporatable with, a variety of conventional telephone-answering devices to decode proper incoming code signals, while rejecting all other forms of signals. The output of the decoder is usable to provide a control function in an answering device, such as to activate the mechanism therein to play out accumulated recorded messages.

These and other objects and features of the invention will become more fully apparent as the description which now follows is read in conjunction with the accompanying drawings.

DETAILED DESCRIPTION OF THE INVENTION

1. Explanation of Terminology

Figure 1:
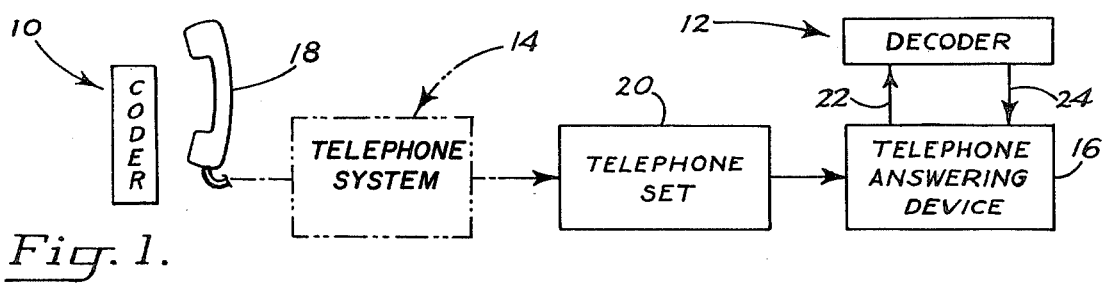
FIG. 1 is very simplified block diagram illustrating the invention in use with a conventional telephone system and telephone-answering device.

Explaining briefly certain terminology which will be used in the description that follows, various components shown in the drawings operate in response to a pair of voltage levels. More specifically, one of these levels corresponds to a certain positive voltage (typically about +5 volts) which will be referred to hereinafter as a 1 state the other level corresponds essentially to ground, and will be called hereinafter a 0 state. A terminal or conductor having one of these voltage levels on it will be referred to as being in, or as having on it, either a 1 or a 0 state.

2. Description of Logic Units Used

Among the components illustrated in the drawings which respond to the two voltage levels just mentioned are certain logic gates. More specifically, three different types of gates, all conventional in construction, are employed. These are referred to as AND, NAND and NOR gates.

An AND gate functions as follows: with a 0 state on any input, the gate's output is held in a 0 state; with all inputs in 1 states, the output is also placed in a 1 state.

In a NAND gate: with a 0 state on any input, the output is held in a 1 state; and, with all inputs in 1 states, the output is in a 0 state.

A NOR gate functions whereby: if any input is in a 1 state, the output is held in a 0 state; if all inputs are in 0 states, then the output is placed in a 1 state.

3. The Invention Generally

Turning now to the drawings, and referring first to FIG. 1, indicated in block form at 10 is a coder constructed in accordance with the present invention. At 12 is a decoder, also made pursuant to the invention.

Coder 10 and decoder 12 are used in FIG. 1 in conjunction with a conventional telephone system, shown generally at 14, and a conventional telephone-answering device 16. As will be explained, these devices permit remote accessing, over a telephone line, of messages which have been received and recorded by device 16. More specifically, coder 10 is used adjacent the mouthpiece of a remote telephone handset, such as the handset shown at 18, for supplying a binary-coded audio-frequency message which is transmitted over system 14 to the owner's telephone set, shown in block form at 20. Answering device 16 is connected in the usual fashion to telephone set 20—with decoder 12 connected to device 16 for receiving (and decoding) a coded message over a conductor 22, and for transmitting a control-function signal to the answering device over a conductor 24.

4. The Coder

Figure 2:
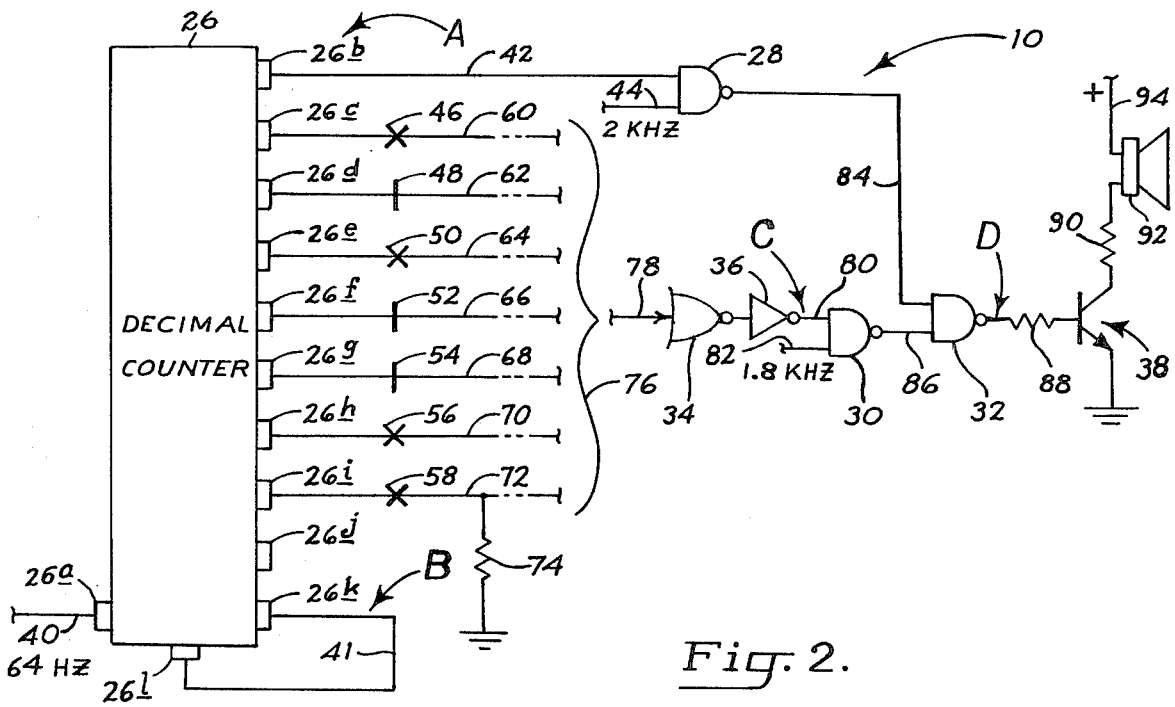
FIG. 2 is a block/schematic diagram of a coder made in accordance with the invention.

FIG. 2 illustrates in block/schematic form details of construction of coder 10. Included therein are a ten-output decimal counter 26, three NAND gates 28, 30, 32, a NOR gate 34, an inverter 36, and a transistor 38. All of these devices are conventional in construction. The three NAND gates each have two inputs. The NOR gate has eight inputs, represented, for reasons of simplification, by a single input lead line.

The counting input, 26a, in counter 26 is connected via a conductor 40 to a conventional 64-Hz clock (not shown). The ten-outputs in the counter are shown at 26b, 26c, 26d, 26e, 26f, 26g, 26h, 26i, 26j, 26k. Output 26k is connected through a conductor 41 to the reset input 26l in the counter.

There normally exists a 0 state on each of the counter's outputs. However, when the first pulse to be counted is received at input 26a, output 26b is switched to a 1 state—all the other outputs remaining in 0 states. When the second pulse to be counted is received, output 26b is returned to a 0 state, and output 26c (alone) is switched to a 1 state. With the counter connected as shown, this process continues until the tenth pulse to be counted is received, which pulse causes output 26k instantaneously to go to a 1 state and to reset the counter to a zero-count condition.

Output 26b is connected through a conductor 42 to the upper input of gate 28 in FIG. 2. The lower input of this gate in the figure is connected through a conductor 44 to a conventional 2-KHz clock (omitted from the drawing). Gate 28, and conductors 42, 44, constitute a marker-signal generator herein. Conductor 44 constitutes a means for furnishing an audio frequency to the gate. Outputs 26c, 26d, 26e, 26f, 26g, 26h, 26i are connected through manually adjustable switches 46, 48, 50, 52, 54, 56, 58, respectively, to conductors 60, 62, 64, 66, 68, 70, 72, respectively. Switches 46, 50, 56, 58 are represented by crossed lines to indicate that, in FIG. 2, they are in an open condition. Switches 48, 52, 54 are shown as straight single lines to indicate that these switches are closed in FIG. 2. Each of conductors 60-72, inclusive, is independently connected to ground through a resistor, such as the resistor shown at 74 for conductor 72. The other resistors have been omitted from the drawing for purposes of simplification. The seven conductors 60-72, inclusive, are each connected to a different one of the eight inputs in NOR gate 34. These connections are simply represented in FIG. 2 by a bracket 76 and a single lead line 78. The eighth (remaining) input in gate 34 is grounded. Counter output 26j is unconnected to anything external to the counter.

Gate 34 has its output connected to the input of inverter 36, the output of which is connected through a conductor 80 to the upper input of NAND gate 30 in FIG. 2. The lower input of this gate in the figure is connected via a conductor 82 to a conventional 1.8-KHz clock (not shown). Gate 34, and conductors 80, 82, constitute a code-signal generator. Conductor 82 constitutes a means for furnishing an audio frequency to the gate.

The upper input of gate 32 in FIG. 2 is connected through a conductor 84 to the output of gate 28, and the lower input of gate 32 in the figure is connected through a conductor 86 to the output of gate 30. Gate 32 has its output connected through a resistor 88 to the base of transistor 38. The emitter of the transistor is grounded, and the collector is connected through a resistor 90 to one end of the drive coil in a loudspeaker 92. The other end of the loudspeaker's drive coil connects to a source of positive voltage through a conductor 94.

5. Operational Description of Coder 10

With coder 10 operating, clock pulses at the rate of 64-Hz are supplied to counting input 26a in counter 26. As a consequence, 0 to 1 to 0 state voltage changes occur serially on the counter's outputs. A 1 state voltage on outputs 26b-26j, inclusive, remains for the full period of one clock pulse. On output 26k, a spike occurs as a consequence of this output being used to reset the counter to a zero-count condition.

Figure 4:
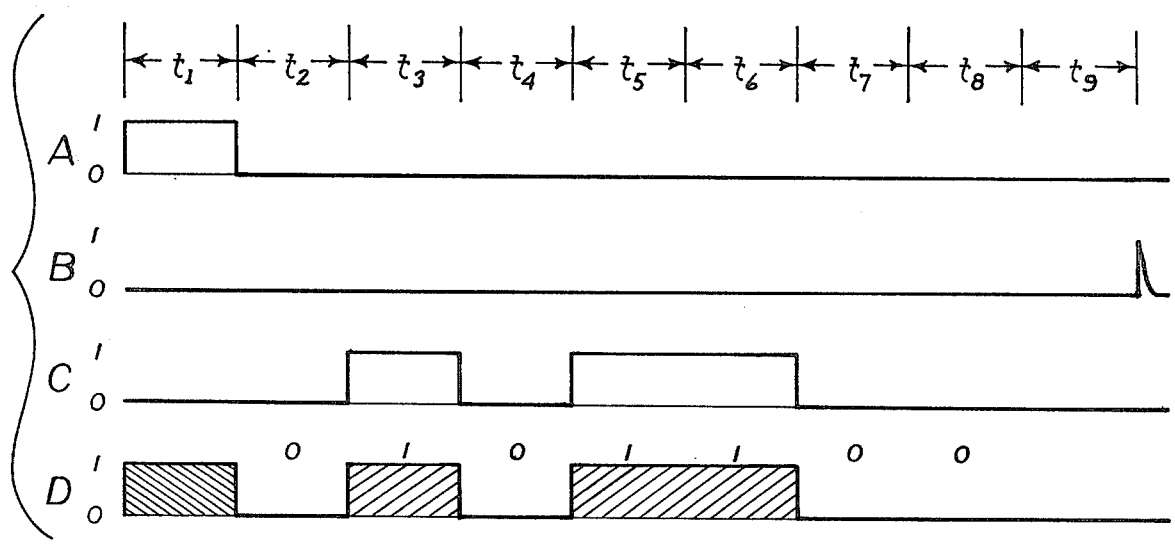
FIG. 4 is a graph presenting, on a common time scale, representations of waveforms which occur at different points within the coder of FIG. 2.

Counter 26, thus, functions to define what is referred to herein as a preselected group of consecutive, code-signal-receptive time slots. Each group includes nine equal-length slots. Referring to FIG. 4, the consecutive time slots in a single group are marked at the top of the drawing, and are designated $t_1-t_9$, inclusive. With counter 26 counting pulses at the rate of 64-Hz, each time slot lasts about 15.6-milliseconds, and the overall group lasts slightly over 140-milliseconds.

Counter output 26b produces on conductor 42 a voltage waveform such as that shown at A in FIG. 4. More particularly, during each group of time slots, output 26b and conductor 42 are placed in a 1 state throughout time slot $t_1$, and at no other time. Output 26c is placed in a 1 state throughout time slot $t_2$, output 26d throughout time slot $t_3$, and so on, with output 26i being placed in a 1 state throughout time slot $t_8$. Output 26k, defines time slot $t_9$.

The voltage waveform (spike) produced on conductor 40 is shown at B in FIG. 4. It will be noticed that this spike occurs exactly at the end of time slot $t_9$.

Whether or not 1 state voltages are applied to conductors 60-72, inclusive, depends upon the settings of the switches which are in series with these conductors. If the switch associated with a particular conductor is open, then the conductor remains at all times in a 0 state by virtue of its being grounded through a resistor, like resistor 74. However, if a conductor's associated switch is closed, then the conductor is placed in a 1 state during the particular time slot associated with the output of the counter which is connected to the switch.

In the particular embodiment of the invention now being described, time slots $t_2-t_8$, are used for defining, ultimately, a pattern of audio code signals. More specifically, these time slots are provided for defining a binary-coded pattern of such signals. The particular pattern produced depends upon the conditions of switches 46-58, inclusive. In the particular setup which is shown in FIG. 2, with switches 48, 52, 54 closed and the others open, only conductors 62, 66, 68 will be placed in 1 states during a group of time slots $t_1-t_9$. Conductor 62 is in a 1 state during time slot $t_3$, conductor 66 during time slot $t_5$, and conductor 68 during time slot $t_6$. Thus, and considering a single "cycle" of counter 26, the pattern (in time) of 0 and 1 states which will exist on conductors 60-72, inclusive, corresponds to the binary-code 0101100. This pattern produces a voltage waveform at the output of inverter 36 which is shown at C in FIG. 2.

Waveform A is used to define herein what is referred to as a marker or flag pulse—such indicating the beginning of the transmission of a pattern of code signals. Each time that conductor 42 is placed in a 1 state, and throughout the time that the conductor remains in this state, gate 28 is open, and passes to the upper input of gate 32 a 2-KHz signal. During this time, it will be noted that the output of the inverter is in a 0 state, and this forces the output of gate 30 to be in a 1 state. As a consequence, gate 32 is open, and the 2-KHz signal supplied its upper input is fed to the base of transistor 38, wherein it is amplified. Thus, loudspeaker 92, during time slot $t_1$, produces an audio tone at the frequency 2-KHz.

At the end of time slot $t_1$, gate 28 is closed, and the 2-KHz frequency is blocked from gate 32. Also, the output of gate 28 is placed in a 1 state. This results in gate 32 being open to whatever is received over conductor 86. During time slots $t_2-t_8$, inclusive, whenever the output of inverter 36 is switched to a 1 state—such occurring during time slots $t_3$, $t_5$, $t_6$, gate 30 is opened, and passes to the lower input of gate 32 the audio frequency 1.8-KHz. This, as was true in the case of the 2-KHz audio signal, is fed to transistor 38, wherein it is amplified, and whereby it drives speaker 92 at this frequency.

As a consequence, and during each single group of time slots, the voltage waveform which appears at the output of gate 32 is depicted at D in FIG. 4. Relatively close cross-hatching, at one angle, is used in the first pulse of this waveform to represent the higher 2-KHz frequency which is produced by loudspeaker 92 at this time. Somewhat broader and differently angled cross-hatching is used alike in the other two pulses contained in this waveform to represent the lower 1.8-KHz frequency produced during these times by the loudspeaker. The waveform pattern which thus exists throughout time slots $t_2$-$t_8$, inclusive, constitutes a pattern of code signals herein.

It will be apparent that by setting up the conditions of switches 46-58, inclusive, a huge number of different binary-coded waveform patterns can be produced. Each such pattern is always preceded by a marker pulse. A marker pulse not only always occupies time slot $t_1$, but also, preferably, occurs at a frequency different from that used for pulses in time slots $t_2$-$t_8$, inclusive.

Coder 10 is used simply by energizing it, and by placing loudspeaker 92 adjacent the mouthpiece in a handset, such as handset 18, which has been connected (in the usual fashion through a telephone system) to a telephone-answering device, such as device 16. It recurrently produces audio marker and code pulses.

It will be apparent from the description which has just been given, that coder 10 in accordance with the invention has an extremely simple construction with relatively few parts, is easily programmed to produce a large number of different binary code patterns, and thus offers a great deal of security to the user. As will further become apparent, the selection of a particular known frequency for code pulses is another factor limiting access by unauthorized persons, as is also the selection of two different specific frequencies for distinguishing marker pulses from code pulses.

6. The Decoder

Figure 3:
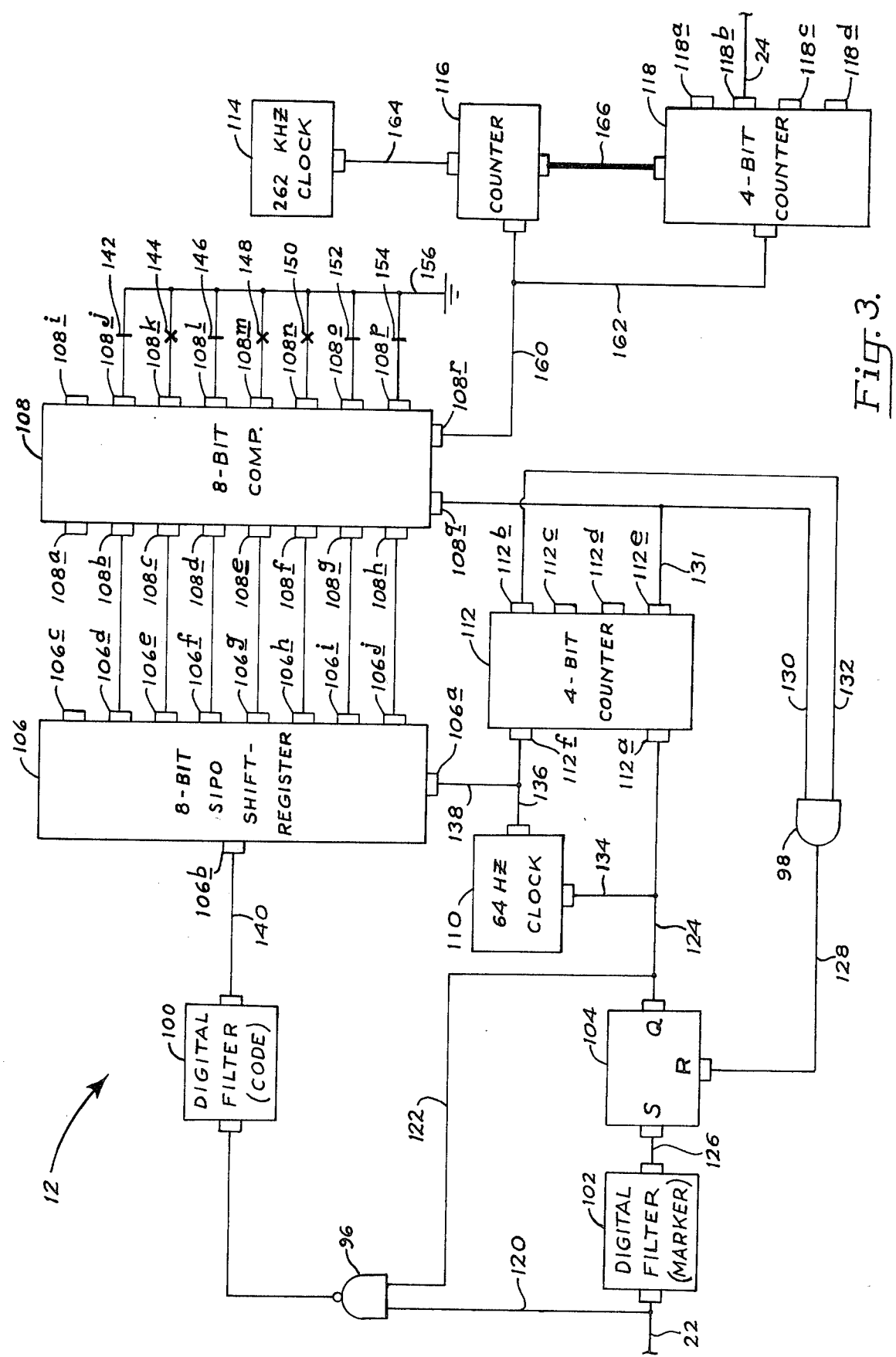
FIG. 3 is a block/schematic diagram of a decoder made according to the invention.

Decoder 12 is shown in FIG. 3. Included therein are a two-input NAND gate 96, a two-input AND gate 98, a pair of digital filters 100, 102, a latch 104, an 8-bit serial-input parallel-output shift-register 106, an 8-bit comparator 108, and a collection of clocks and counters including a 64-Hz clock 110, a 4-bit counter 112, a 262-KHz clock 114, a counter 116 (whose nature will be described shortly), and another 4bit counter 118. Counters 112, 118 are substantially identical in construction. These parts, individually, are conventional in construction. Filter 100 is responsive to the audio frequency 1.8-KHz. Filter 102 responds to the audio frequency 2-KHz.

Previously mentioned conductor 22 is suitably connected to that conductor in answering device 16 which becomes connected with the telephone line on an incoming call being received. This conductor is connected directly to the input in filter 102, and through a conductor 120 to the left input of gate 96 in FIG. 3. The output of gate 96 connects with the input in filter 100. The right input in gate 96 connects through a conductor 122 with a conductor 124 that interconnects the Q output in latch 104 and the enable input, 112a, in counter 112. The output in filter 102 connects through a conductor 126 with the set input (S) in latch 104. The reset input (R) in the latch connects through a conductor 128 with the output of gate 98. The upper input of gate 98 connects through a conductor 130 with the enable input, 108q, in comparator 108. Also, it connects through conductor 130 and a conductor 131 with output 112e in counter 112. A conductor 132 connects the lower input of gate 98 in FIG. 3 to output 112b in counter 112. Counter ouputs 112c, 112d are left unconnected to anything external to counter 112. Outputs 112b, 112c, 112d, 112e are known commonly as the A, B, C, D outputs—output A reflecting the least significant digit, and output D reflecting the most significant digit, in a stored count.

The enable input in clock 110 connects through a conductor 134 with conductor 124. The output of the clock connects directly through a conductor 136 with the counting input 112f, in counter 112, and through a conductor 138 with what is known as the clock pulse input, 106a, in shift-register 106.

The output of filter 100 connects through a conductor 140 with the data input, 106b, in shift-register 106. Shift-register 106 includes eight outputs designated 106c, 106d, 106e, 106f, 106g, 106h, 106i, 106j. The lower seven of these outputs are connected by conductors, which are obvious in FIG. 3, to the lower seven of eight left-side inputs designated 108a, 108b, 108c, 108d, 108e, 108f, 108g, 108h on the left side of comparator 108 in FIG. 3. Comparator 108 includes a right-side set of eight outputs designated 108i, 108j, 108k, 108l, 108m, 108n, 108o, 108p.

Connected to inputs 108j-108p, inclusive, are manually adjustable switches 142, 144, 146, 148, 150, 152, 154, respectively. These switches are operable to connect the associated right inputs in the comparator with a grounded conductor 156. What is known as the A=B output in the comparator, such being shown at 108r, connects through a conductor 160 directly with the reset input in counter 116, and through conductor 160 and a conductor 162 with the counting input in counter 118.

A conductor 164 interconnects the output of clock 114 and the counting input in counter 116. In order to simplify FIG. 3, a wide darkened line 166 is shown interconnecting the output side of counter 116 with the reset input in counter 118. It is to be understood herein that line 166 is intended to represent a subcircuit including a plurality of conductors connected to all of those outputs in counter 116 which are switched into 1 states, simultaneously, on a certain count being registered in the counter—with these conductors being connected to the input side of a suitable AND gate whose output (single) is connected to counter 118's reset input. The particular count which is significant in counter 116 will be explained shortly.

Counter 118, like counter 112, has four outputs—these being designated 118a, 118b, 118c, 118d. These outputs correspond to the commonly referred-to A, B, C, D outputs mentioned above in connection with counter 112.

Previously mentioned conductor 24 is connected to output 118b.

7. Operational Description of Decoder 12

Obviously, decode 12 is intended to be used in cooperation with coder 10. To this end, it is necessary that decoder 12 be "programmed" to respond to the particular pattern of code signals which has been selected for coder 10. Such programming is done through manipulation of switches 142-154, respectively. As will be more fully explained, comparator inputs 108b, 108j relate to time slot $t_2$, inputs 108c, 108k to time slot $t_3$, inputs 108d, 108l to time slot $t_4$, etc., with inputs 108h, 108p relating to time slot $t_8$. Outputs 106d-106j, respectively, correspond to time slots $t_1$-$t_8$, respectively.

Accordingly, switch 142 is set to place on input 108j a voltage state corresponding to that which is expected to be received in time slot $t_2$ with proper operation of coder 10. This, of course, is a 0 state, and hence switch 142 is closed to connect input 108j to ground. Opening of a switch results in the associated input being placed in a 1 state. Proper biasing is provided the inputs to assume such operation. Thus, and proceeding through the code pattern which has been established for coder 10, switch 144 is open, 146 closed, 148, 150 open, and 152, 154 closed.

When comparator 108 is enabled, through a placement of a 1 state on its enable input, 108q, it makes a comparison between the voltage states existing on its corresponding pairs of left-side/right-side inputs. If these voltage states exactly match up on the seven lower pairs of inputs, then the comparator produces on its A=B output, 108r, a voltage state change from 0 to 1.

Shift-register 106, when it receives a clock pulse from clock 110, inputs and applies to its output 106j, the voltage state then existing on its data input 106b. A successive data voltage states are "read in" to the shift-register, the earlier-read voltage states are shifted serially upwardly in FIG. 3 on its outputs. Thus, and in the case of seven data voltage states being read into the shift-register, the first-read voltage state will, in the end, appear on output 106d, and the last-read voltage state will appear on output 106j.

Let us consider now how the decoder operates when a marker pulse, followed by a pattern of code signals, from coder 12 is received on conductor 22. Receipt of a marker pulse is detected by filter 102, whereupon the filter, for the period of time that the marker pulse exists, switches its output from a 0 state to a 1 state. The marker pulse does not pass through gate 96 inasmuch as, at this time, conductor 122 is held in a 0 state by virtue of that state being on the Q output of latch 104. Hence, the output of gate 96 is held in a 1 state.

With the change from 0 to 1 on the output of filter 102, latch 104 is "set", whereupon its Q output changes from a 0 state to a 1 state. This action opens gate 96, and enables both clock 110 and counter 112. Clock 112 immediately being operating, and supplies clock pulses both to the counting input of counter 112 and to the clock pulse input of shift-register 106.

It will be observed that, with the marker pulse occupying time slot $t_1$, the first clock pulse from clock 110 is received during time slot $t_2$. When this first pulse is produced, it is counted in counter 112, and it causes shift-register 106 to place on output 106j a voltage state which then corresponds to the voltage state on data input 106b. Inasmuch as time slot $t_2$ contains no code-signal pulse, a 0 state voltage exists on the data input of the shift-register, and hence a 0 is applied to output 106j.

During time slot $t_3$, conductor 22 receives the first code-signal signal, at the frequency 1.8-KHz, and this frequency is applied to the input of filter 100, which then switches its output from a 0 state to a 1 state. The second clock pulse from clock 110 is produced during time slot $t_3$, and hence the 1 state voltage now existing at the data input of the shift-register is applied to output 106j, with the previously inputted 0 state voltage shifted from output 106j to output 106i. This process continues through and including time slot $t_8$, after which the following voltage states exist on the following outputs in the shift-register: 106d—0, 106e—1, 106f—0, 106g—1, 106h—1, 106i—0, 106j—0.

The eighth clock pulse produced by clock 110 occurs during time slot $t_9$, and produces on outputs 112b, 112c, 112d, 112e in the counter 0, 0, 0, and 1 states, respectively. The 1 state on output 112e has no effect on AND gate 98, inasmuch as conductor 132 is now in a 0 state. However, it does have an effect on comparator 108.

More specifically, the state change from 0 to 1 on enable input 108q causes the comparator to make a comparison between the voltage states existent on its matching, or corresponding, pairs of outputs previously discussed. This comparison is made during time slot $t_9$. Since, as we know, a proper code pattern, i.e., one intended to be received by decoder 12, has in fact been received, and since the voltage states match on the corresponding pairs of outputs in the comparator, the comparator switches the voltage state on its A=B output, 108r, from 0 to 1. This activity resets counter 116 (which is normally in a condition continuously counting pulses received from clock 114), and places a count of "one" in counter 118.

A digression is in order at this point to explain the cooperative operation of clock 114 and counter 116. Counter 116 includes a number of so-called "divide/by" circuits, whereby the relatively high-frequency clock rate of clock 114 is divided down to progressively lower rates. The counter outputs to which connections are represented by line 166 are those outputs all of which are in 1 states on counter 116 recording a count of 40,960. This count, when related to the frequency of clock 114, occurs approximately 156-milliseconds after resetting of counter 116 to a zero-count condition. If such resetting in fact occurs, and again recalling the nature of what is represented by line 166, counter 118 is reset to a zero-count condition—thus removing the count of "one" just previously recorded by it.

Explaining more fully the significance of the operation which has just been described, it has been decided herein that in order to validate receipt by decoder 12 of proper communication from coder 10, it is necessary to receive two successive time slot groups containing appropriate marker pulses and code pulse patterns. Recalling that resetting of counter 116 takes place immediately following receipt of a first, proper code pulse pattern, it will be evident that clock 114 and counter 116 function to allow a "time window", so-to-speak, of about 156-milliseconds, for the next successive proper code pulse pattern to be received. The reason for this is that conductor 24, on which the presence of a 1 state voltage is necessary to effect a control function in telephone-answering device 16, is connected to that output terminal of counter 118 (118b) which is first switched to a 1 state on the counter storing a count of "two". If counter 116 resets counter 118 to a zero-count condition, as described above, it naturally inhibits up-counting to "two", and indicates that, within the prescribed "time window", a second, successive correct code pulse pattern has not been received.

However, let us consider now that a second code pulse pattern properly follows the first one just described above.

The next (ninth) clock pulse produced by clock 110 is counted in counter 112, whereupon 1 state voltages exist simultaneously on outputs 112b, 112e. These effect a change in the state on the output of gate 98 from 0 to 1, which in turn resets latch 104. With resetting of latch 104, gate 96 is closed, and clock 110 and counter 112 are disabled.

When the next marker pulse is received, followed by a proper pattern of code signals, exactly the same series of steps described above, with respect to the first-received code pattern, are performed in the decoder—the only difference being that operation of comparator 108 produces a count of "two" in counter 118. Such a count verifies correct receipt of two successive transmissions from coder 10, and causes the necessary control-function 1 state voltage to appear on conductor 24. This 1 state voltage change is then used in any one of a variety of conventional manners to initiate operation of the telephone-answering device so as to play out on the telephone line accumulated recorded messages.

8. Conclusion

Accordingly, it will be apparent that the apparatus and method of the invention offer all of the features and advantages ascribed to them earlier. The proposed apparatus and method can, of course, be made and practiced in a number of different ways which will be obvious to those skilled in the art. For example, different frequencies than those selected may be used in the marker and code pulses. A somewhat more sophisticated development might choose to use different frequencies for each successive code pulse. Obviously, a greater or lesser number of time slots might be assigned for the placement of code pulses. Yet another variation might be the introduction of multiple marker pulses. Others will suggest themselves.

Therefore, while a preferred embodiment of the invention, and a preferred method of practicing the same, are set forth herein, it is appreciated that a number of variations and modifications may be made without departing from the spirit of the invention.

It is claimed and desired to secure by Letters Patent:

1. Apparatus for communicating a selected binary-coded message comprising
    a marker signal generator for producing recurrent time-spaced marker signals each in the form of a time-controlled burst of one audio frequency,
    means operatively connected to said marker-signal generator for defining, in each of the time-spans between successive marker signals, a predetermined plurality of successive code-signal-receptive time slots, and
    a code-signal generator operatively connected to said marker-signal generator and to said defining means for placing, in each such plurality of time slots, a selected pattern of code signals, with each code signal occupying a different time slot and taking the form of a time-controlled burst of another audio frequency, and with the arrangement of presences and absences of code signals in each such plurality of time slots forming the selected binary-coded meassage.

2. A method for communicating a selected binary-coded audio message comprising
    producing recurrent time-spaced marker signals with each marker signal taking the form of a time-controlled burst of one audio frequency,
    defining, in each of the time spans between successive marker signals, a predetermined plurality of successive code-signal-receptive time slots, and
    placing, in each such plurality of time slots, a selected pattern of code signals in the form of time-controlled bursts of another audio frequency, with each code signal occupying a different time slot, and with the arrangement of presences and absences of code signals in each such plurality of time slots forming the selected binary-coded message.

* * * * *